US009107202B2

(12) United States Patent
Doppler et al.

(10) Patent No.: US 9,107,202 B2
(45) Date of Patent: Aug. 11, 2015

(54) METHODS, APPARATUSES AND COMPUTER PROGRAM PRODUCTS FOR PROVIDING COORDINATION OF DEVICE TO DEVICE COMMUNICATION

(75) Inventors: Klaus Doppler, Espoo (FI); Carl Wijting, Helsinki (FI); Cassio Ribeiro, Espoo (FI); Mika Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 595 days.

(21) Appl. No.: 12/992,827

(22) PCT Filed: May 15, 2008

(86) PCT No.: PCT/IB2008/051920
§ 371 (c)(1),
(2), (4) Date: Dec. 20, 2010

(87) PCT Pub. No.: WO2009/138820
PCT Pub. Date: Nov. 19, 2009

(65) Prior Publication Data
US 2011/0106952 A1   May 5, 2011

(51) Int. Cl.
*H04W 72/04* (2009.01)
*H04W 72/02* (2009.01)
*H04W 92/18* (2009.01)

(52) U.S. Cl.
CPC .......... *H04W 72/0406* (2013.01); *H04W 72/02* (2013.01); *H04W 72/042* (2013.01); *H04W 72/0413* (2013.01); *H04W 92/18* (2013.01)

(58) Field of Classification Search
CPC ... H04W 72/02; H04W 72/04; H04W 72/042; H04W 72/0406; H04W 72/0413; H04W 92/18

USPC ......................................... 709/226; 455/452.1
See application file for complete search history.

(56) References Cited

U.S. PATENT DOCUMENTS 6,301,616 B1 * 10/2001 Pal et al. ....................... 709/226
2001/0026539 A1 * 10/2001 Kornprobst et al. .......... 370/329
(Continued)

FOREIGN PATENT DOCUMENTS

CN          1404700 A       3/2003
EP          1608108 A      12/2005
(Continued)

OTHER PUBLICATIONS

Doppler et al., "Device-to-device communication as an underlay to LTE-advanced networks," Communications Magazine, IEEE, vol. 47, No. 12, pp. 42, 49, Dec. 2009. (Most Current Version—Dec. 11, 2009.) doi: 10.1109/MCOM.2009.5350367.*
(Continued)

*Primary Examiner* — Kostas Katsikis
(74) *Attorney, Agent, or Firm* — Mintz Levin Cohn Ferris Glovsky and Popeo, P.C.

(57) ABSTRACT

An apparatus for providing coordination of device to device communication may include a processor. The processor is configured to communicate a request for a resource allocation to a network communication node (300). The resource allocation is related to resources usable for device to device communication between a first terminal communicating the request and a second terminal. The processor is further configured to receive a resource allocation including an amount and duration of resources to be used for the device to device communication in response to the request (310), and utilize the resource allocation for device to device communication with the second terminal (320).

28 Claims, 7 Drawing Sheets

(56) References Cited

U.S. PATENT DOCUMENTS

| | | | |
|---|---|---|---|
| 2003/0225827 A1* | 12/2003 | Andersen et al. | 709/203 |
| 2004/0043783 A1 | 3/2004 | Anderson | |
| 2004/0097254 A1* | 5/2004 | Laroia et al. | 455/522 |
| 2005/0080943 A1* | 4/2005 | Pafumi et al. | 710/22 |
| 2005/0163070 A1 | 7/2005 | Farnham et al. | |
| 2006/0159004 A1* | 7/2006 | Ji | 370/208 |
| 2006/0205413 A1* | 9/2006 | Teague | 455/452.1 |
| 2006/0205414 A1* | 9/2006 | Teague | 455/452.1 |
| 2007/0104138 A1 | 5/2007 | Rudolf et al. | |
| 2007/0230423 A1 | 10/2007 | Yoshida et al. | |
| 2007/0268862 A1* | 11/2007 | Singh et al. | 370/329 |
| 2008/0069047 A1* | 3/2008 | Yee et al. | 370/331 |
| 2008/0076433 A1 | 3/2008 | Cheng et al. | |
| 2008/0117867 A1* | 5/2008 | Yin et al. | 370/329 |
| 2008/0219228 A1* | 9/2008 | Seok et al. | 370/338 |
| 2008/0310361 A1* | 12/2008 | Cho et al. | 370/329 |
| 2009/0247166 A1* | 10/2009 | Luo et al. | 455/436 |
| 2009/0253421 A1 | 10/2009 | Camp, Jr. et al. | |
| 2009/0262691 A1* | 10/2009 | Lim et al. | 370/329 |
| 2009/0296680 A1* | 12/2009 | Suzuki et al. | 370/342 |
| 2009/0323626 A1* | 12/2009 | Lim et al. | 370/329 |
| 2011/0098071 A1* | 4/2011 | Lee et al. | 455/509 |

FOREIGN PATENT DOCUMENTS

| | | |
|---|---|---|
| WO | 01/62026 A | 8/2001 |
| WO | WO 03026224 A1 * | 3/2003 |
| WO | WO 03028315 A1 * | 4/2003 |
| WO | 2005/039105 A | 4/2005 |
| WO | WO-2007056103 A1 | 5/2007 |
| WO | 2008/005922 A | 1/2008 |

OTHER PUBLICATIONS

Janis et al., "Interference-Aware Resource Allocation for Device-to-Device Radio Underlaying Cellular Networks," Vehicular Technology Conference, 2009. VTC Spring 2009. IEEE 69th , vol., no., pp. 1, 5, Apr. 26-29, 2009. doi: 10.1109/VETECS.2009.5073611.*

Doppler et al., "Device-to-Device Communications; Functional Prospects for LTE-Advanced Networks," Communications Workshops, 2009. ICC Workshops 2009. IEEE International Conference on , vol., no., pp. 1, 6, Jun. 14-18, 2009 doi: 10.1109/ICCW.2009.5208020.*

Yoon et al., "iDLS: Inter-BSS direct link setup in IEEE 802.11 WLANs," Communications and Information Technologies, 2007. ISCIT '07. International Symposium on , vol., no., pp. 1015, 1020, Oct. 17-19, 2007 doi: 10.1109/ISCIT.2007.4392165.*

International Search Report and Written Opinion of the International Searching Authority for corresponding Patent Cooperation Treaty Application No. PCT/IB2008/051920, dated Feb. 26, 2009, 11 pages.

IEEE Standard for Information technology—Telecommunications and information exchange between systems—Local and metropolitan area networks—Specific requirements Part 11: Wireless LAN Medium Access Control (MAC) and Physical Layer (PHY) Specifications IEEE Std 802.11™-2007 (Revision of IEEE Std 802.11-1999 ) Jun. 12, 2007.

IEEE Standard for Information technology—Telecommunications and information exchange between systems—Local and metropolitan area networks—Specific requirements Part 15.1: Wireless medium access control (MAC) and physical layer (PHY) specifications for wireless personal area networks (WPANs) Jun. 14, 2005.

IEEE Std 802.16™-2009, (Revision of IEEE Std 802.16-2004) IEEE Standard for Local and metropolitan area networks Part 16: Air Interface for Broadband Wireless Access Systems May 29, 2009.

Final Rejection received in corresponding U.S. Appl. No. 12/455,644, Dated Jan. 27, 2012. pp. 1-27.

* cited by examiner

METHODS, APPARATUSES AND COMPUTER PROGRAM PRODUCTS FOR PROVIDING COORDINATION OF DEVICE TO DEVICE COMMUNICATION

RELATED APPLICATION

This application was originally filed as PCT Application No. PCT/IB2008/051920 filed May 15, 2008.

TECHNOLOGICAL FIELD

Embodiments of the present invention relate generally to communications technology and, more particularly, relate to apparatuses, methods and computer program products for enabling the coordination of device to device communication.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, wireless communication has become increasingly popular in recent years due, at least in part, to reductions in size and cost along with improvements in battery life and computing capacity of mobile electronic devices. As such, mobile electronic devices have become more capable, easier to use, and cheaper to obtain. Due to the now ubiquitous nature of mobile electronic devices, people of all ages and education levels are utilizing mobile terminals to communicate with other individuals or contacts, receive services and/or share information, media and other content.

Communication networks and technologies have been developed and expanded to provide robust support for mobile electronic devices. For example, the Worldwide Interoperability for Microwave Access (WiMAX), is a telecommunications technology aimed at providing wireless data over long distances in a variety of ways, from point-to-point links to full mobile cellular type access. The evolved universal mobile telecommunications system (UMTS) terrestrial radio access network (E-UTRAN) is also currently being developed. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards. In a typical network configuration mobile users communicate with each other via communication links maintained by the network. In this regard, for example, an originating station may typically communicate data to network devices in order for the network devices to relay the data to a target station.

Recently, efforts have been made to provide for device to device communication. More particularly, device to device communication sharing the same band that a communication network such as a cellular network uses may be desirable. Several mechanisms for enabling device to device communications in this way have been developed recently. For example, Hiperlan 2, Tetra, WLAN (wireless local area network), WiMAX, and TD-SCDMA (Time Division-Synchronous Code Division Multiple Access) are examples in which such mechanisms have been employed.

In Hiperlan 2, a mobile terminal or user equipment (UE) associated with a first user may send a resource request (e.g., several orthogonal frequency division multiplexing (OFDM) symbols=slots) for direct communication with another UE to a central controller. After receiving a resource grant, the UE of the first user may transmit to the UE of the other user in the granted slots within the direct link phase in a media access control (MAC) frame. If the UE of the other user wants to transmit to the UE of the first user, the UE of the other user also has to reserve slots for such communication. In one instance, in an acknowledged mode, the central controller reserves slots for the acknowledgements of the other UE. Hiperlan 2 also enables a UE to request a fixed slot allocation. However, the allocation is always for a single UE, so the central controller as well as other UEs in a direct mode cannot transmit at the same time. Accordingly, this does not make efficient use of available radio resources since each UE has to reserve slots for each and every transmission which results in high signaling load. Additionally, using fixed slot allocation the number of direct links in the subnet is limited and only full OFDM symbols can be reserved, which may create a excessively large usage of system bandwidth of, for example, 100 MHz with 2048 subcarriers (e.g., assuming 1600 usable subcarriers and 64QAM modulation this equals to 8 kb for one OFDM symbol, but for example a TCP/IP acknowledgement packet has only a size of 320 b).

Tetra enables the reservation of several frequency channels for device to device communication. However, the fixed allocation of channels for device to device communication reduces the amount of resources available for base station to UE communication. WLAN enables a UE to sense a communication medium and, if the medium is free or available, the UE transmits. However, the access point (AP) has no direct ability to control the device to device links. A proposal has been made with respect to WiMAX to reserve a zone (e.g., several full OFDM symbols) for device to device communication. However, only full OFDM symbols can be reserved which, as indicated above, may be too much for a typical system bandwidth.

In light of the issues discussed above, it may be desirable to provide a mechanism for enabling an improved coordination of device to device communications that may address at least some of the problems described.

BRIEF SUMMARY OF EXEMPLARY EMBODIMENTS

A method, apparatus and computer program product are therefore provided that may enable coordination of device to device communication. Accordingly, an exemplary embodiment of the present invention may enable the allocation of time/frequency resources to device to device connections. Thus, for example, a first UE may take a lead role in setting up a device to device link between two UEs, while the other device (e.g., a second UE) is a follower. The first UE (e.g., lead UE) may request device resources from the network and, when such resources are allocated, communicate the resources to the other UE. As an alternative, the network may communicate the resources to both UEs. In either case, embodiments of the present invention may provide that the flexibility of OFDM access (OFDMA) be employed to access and to allocate resources in the time and frequency domain to the UEs. As such, for example, a limited number of subcarriers and time-slots may be provided for device to device communications. Accordingly, for example, network resources may be shared between the device to device communication and AP to UE communication links.

In one exemplary embodiment, a method of providing coordination of device to device communication is provided. The method may include receiving a request for a resource allocation from a first terminal. The resource allocation may be related to resources usable for device to device communication between the first terminal and a second terminal. The method may further include determining a resource allocation including an amount and duration of resources to be provided in response to the request, and communicating the resource allocation to the first terminal.

In another exemplary embodiment, a computer program product for providing coordination of device to device communication is provided. The computer program product may include at least one computer-readable storage medium having computer-executable program code portions stored therein. The computer-executable program code portions may include a first program code portion, a second program code portion and a third program code portion. The first program code portion may be for receiving a request for a resource allocation from a first terminal. The resource allocation may be related to resources usable for device to device communication between the first terminal and a second terminal. The second program code portion may be for determining a resource allocation including an amount and duration of resources to be provided in response to the request. The third program code portion may be for communicating the resource allocation to the first terminal.

In another exemplary embodiment, an apparatus for providing coordination of device to device communication is provided. The apparatus may include a processor that may be configured to receive a request for a resource allocation from a first terminal. The resource allocation may be related to resources usable for device to device communication between the first terminal and a second terminal. The processor may be further configured to determine a resource allocation including an amount and duration of resources to be provided in response to the request, and communicate the resource allocation to the first terminal.

In another exemplary embodiment, an apparatus for providing coordination of device to device communication is provided. The apparatus includes means for receiving a request for a resource allocation from a first terminal. The resource allocation may be related to resources usable for device to device communication between the first terminal and a second terminal. The apparatus may further include means for determining a resource allocation including an amount and duration of resources to be provided in response to the request, and means for communicating the resource allocation to the first terminal.

In one exemplary embodiment, a method of providing coordination of device to device communication is provided. The method may include communicating a request for a resource allocation to a network communication node. The resource allocation may be related to resources usable for device to device communication between a first terminal communicating the request and a second terminal. The method may further include receiving a resource allocation including an amount and duration of resources to be used for the device to device communication in response to the request, and utilizing the resource allocation for device to device communication with the second terminal.

In another exemplary embodiment, a computer program product for providing coordination of device to device communication is provided. The computer program product may include at least one computer-readable storage medium having computer-executable program code portions stored therein. The computer-executable program code portions may include a first program code portion, a second program code portion and a third program code portion. The first program code portion may be for communicating a request for a resource allocation to a network communication node. The resource allocation may be related to resources usable for device to device communication between a first terminal communicating the request and a second terminal. The second program code portion may be for receiving a resource allocation including an amount and duration of resources to be used for the device to device communication in response to the request. The third program code portion may be for utilizing the resource allocation for device to device communication with the second terminal.

In another exemplary embodiment, an apparatus for providing coordination of device to device communication is provided. The apparatus may include a processor that may be configured to communicate a request for a resource allocation to a network communication node. The resource allocation may be related to resources usable for device to device communication between a first terminal communicating the request and a second terminal. The processor may be further configured to receive a resource allocation including an amount and duration of resources to be used for the device to device communication in response to the request, and utilize the resource allocation for device to device communication with the second terminal.

In another exemplary embodiment, an apparatus for providing coordination of device to device communication is provided. The apparatus includes means for communicating a request for a resource allocation to a network communication node. The resource allocation may be related to resources usable for device to device communication between a first terminal communicating the request and a second terminal. The apparatus may further include means for receiving a resource allocation including an amount and duration of resources to be used for the device to device communication in response to the request, and means for utilizing the resource allocation for device to device communication with the second terminal.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6:
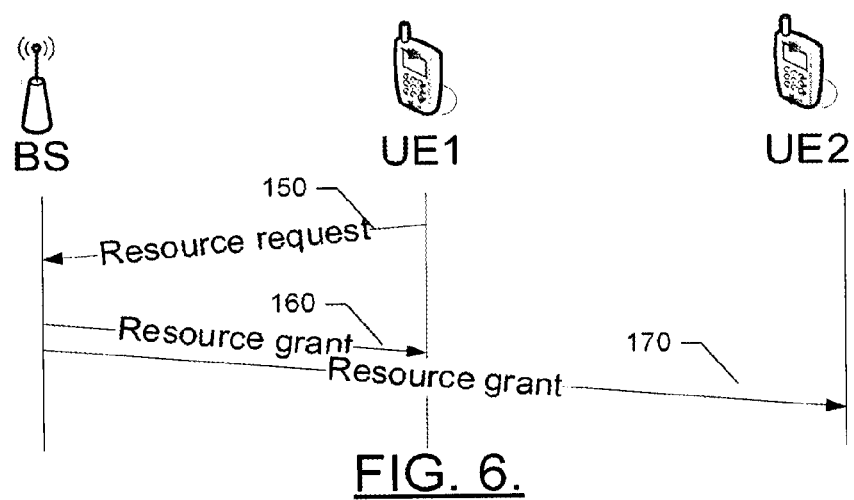
Figure 7:
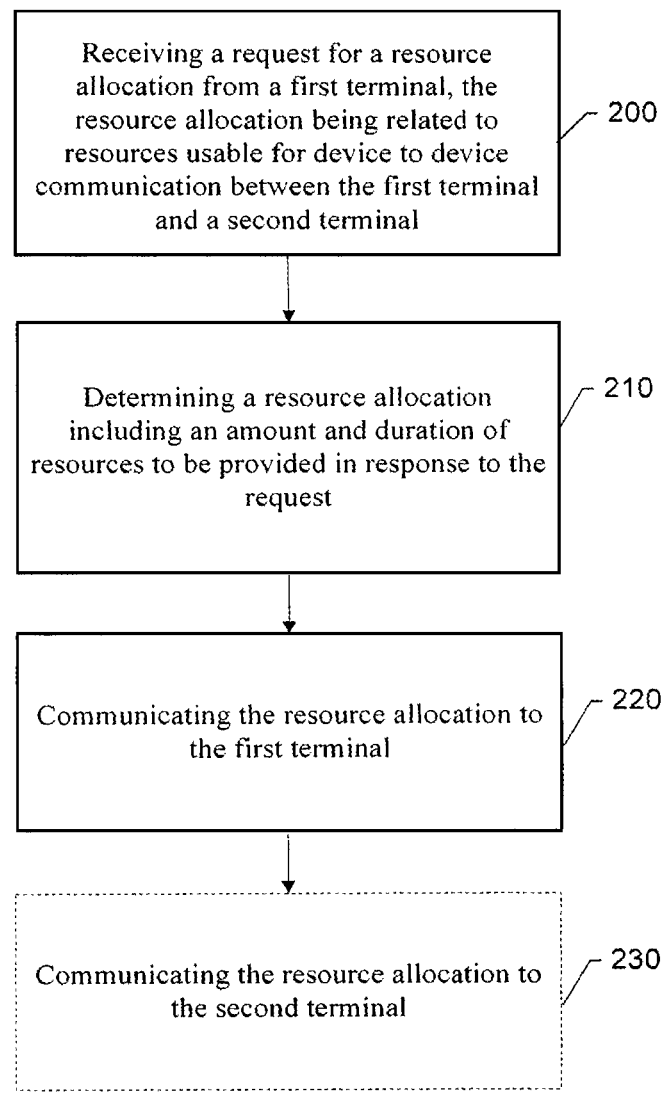
Figure 8:
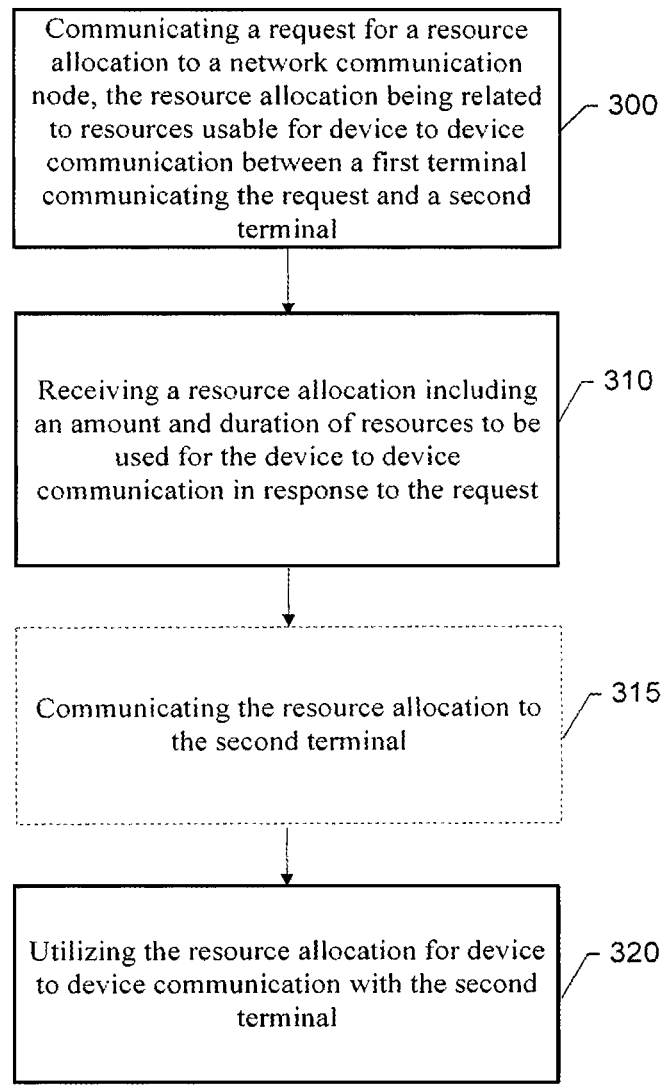

FIG. 6 illustrates a first UE and a second UE that are associated with the same AP establishing device to device communication according to an exemplary embodiment of the present invention; and FIG. 7 is a flowchart according to an exemplary method of providing coordination of device to device communication according to an exemplary embodiment of the present invention; and FIG. 8 is a flowchart according to another exemplary method of providing coordination of device to device communication according to an exemplary embodiment of the present invention.

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
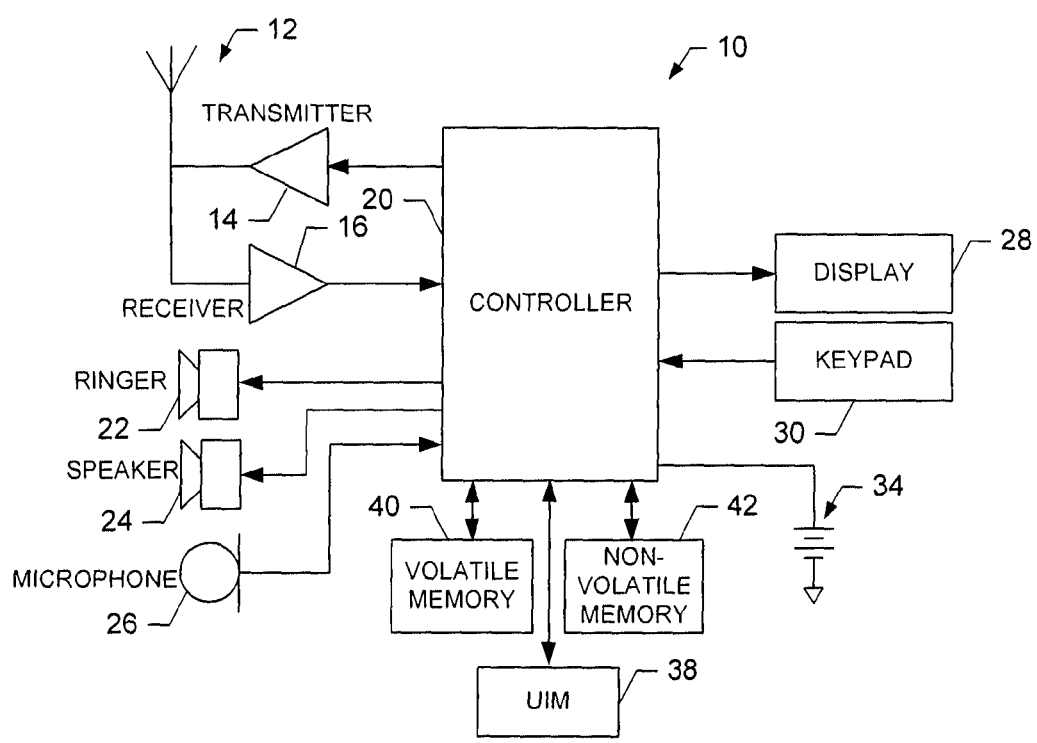
FIG. 1 is a schematic block diagram of a mobile terminal according to an exemplary embodiment of the present invention.

FIG. 1, one exemplary embodiment of the invention, illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 may include an antenna 12 (or multiple antennas) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN, with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks described below in connection with FIG. 2.

It is understood that the apparatus, such as the controller 20, may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication.

Figure 2:
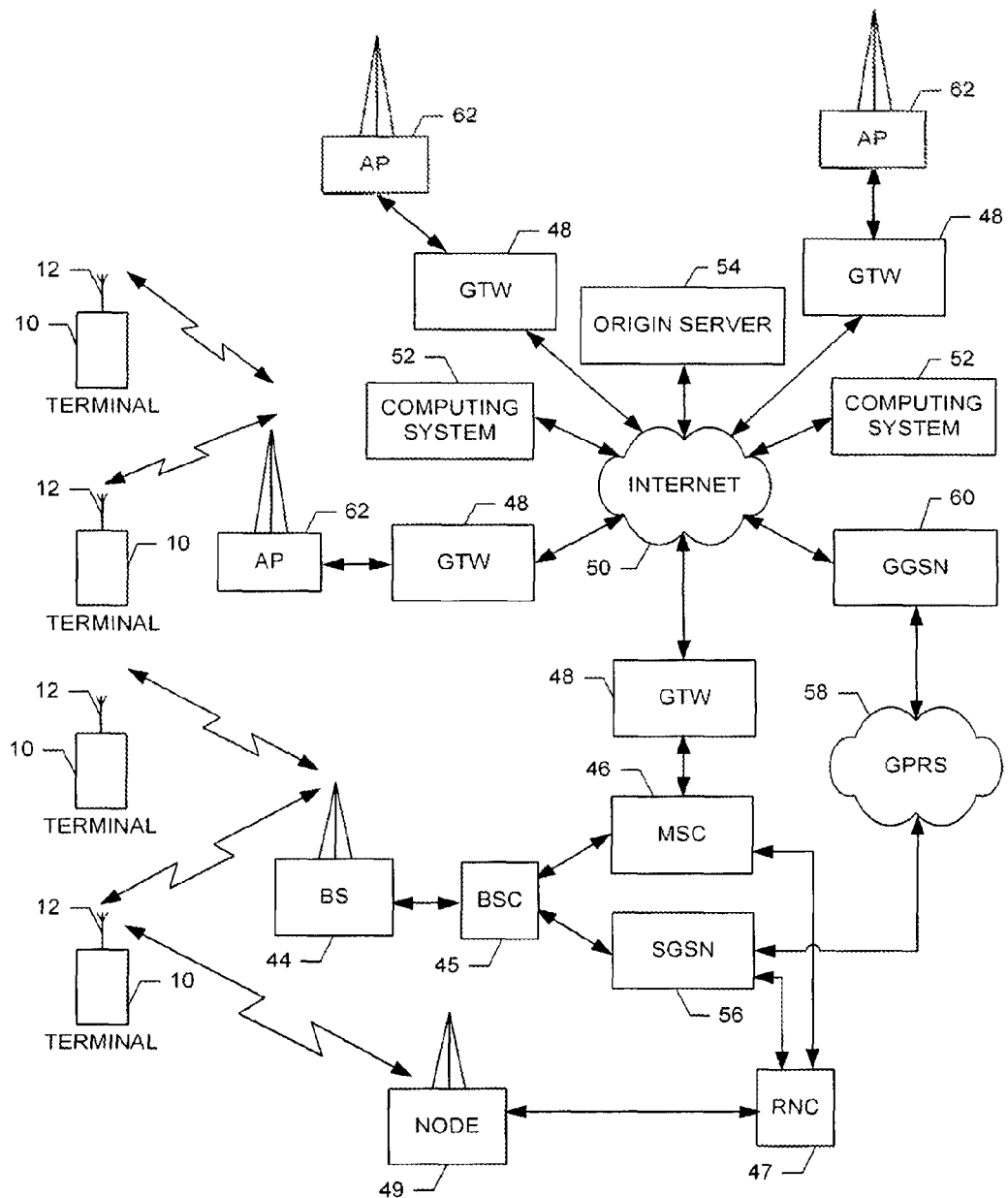
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In some embodiments, the mobile terminal 10 may be capable of receiving communication from multiple cells (e.g., multiple BSs or APs) at any given time or at different times. Furthermore, in some embodiments, the system of FIG. 2 could represent a multiple radio access technology environment. In this regard, for example, the BS 44 may be coupled to the SGSN 56 and the MSC 46 via a base station controller (BSC) 45 that may control the BS 44. The BS 44 and the BSC 45 may be associated with a first radio access technology (RAT) (e.g., a 2G RAT). Meanwhile, the SGSN 56 and the MSC 46 may also be coupled to a radio network controller (RNC) 47 of a second RAT (e.g., a 3G RAT). The RNC 47 may in turn be in communication with one or more nodes (e.g., node-Bs) 49, one or more of which may be capable of communication with the mobile terminal 10 at any given time. As such, the mobile terminal 10 may be configured to be able to communicate with (e.g., select a cell associated with) either the first RAT or the second RAT. Furthermore, additional RATs may also be included in the system of FIG. 2 so that the mobile terminal 10 may be enabled to communicate with any of a plurality of different RATs.

In an exemplary embodiment, content or data may be communicated over the system of FIG. 2 between a mobile terminal, which may be similar to the mobile terminal 10 of FIG. 1, and a network device of the system of FIG. 2 in order to, for example, execute applications or establish communication (for example, for purposes of content or information sharing) between the mobile terminal 10 and other mobile terminals. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a server, personal computer or other device, absent any communication with the system of FIG. 2.

An exemplary embodiment of the present invention will now be described in connection with an LTE system in operation in the same area as two devices seeking to establish device to device communications. As such, it may be assumed that the two devices may each be capable of communication with LTE system or network devices. However, as indicated in FIG. 2, embodiments of the present invention could also be employed in connection with other RATs such as, for example, other OFDMA systems such as IEEE 802.16 techniques like WiMAX. As such, an exemplary embodiment of coordination of device to device communication will be described hereinafter in connection with the example shown in FIGS. 3 and 4.

Figure 3:
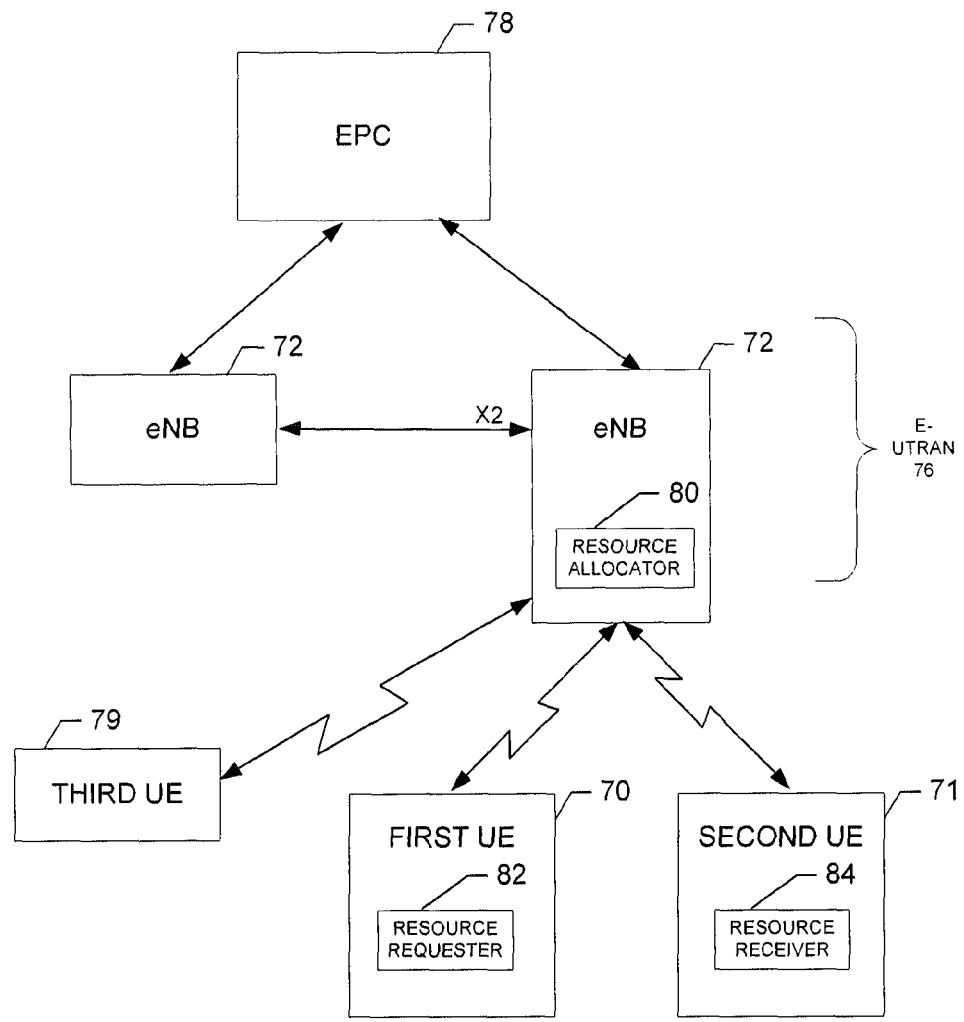
FIG. 3 illustrates an example of a system for providing coordination of device to device communication according to an exemplary embodiment of the present invention.

Referring now to FIG. 3, a schematic block diagram showing a system for providing a mechanism for enabling coordination of device to device communication according to an exemplary embodiment of the present invention is provided. However, FIG. 3 is illustrative of one exemplary embodiment, and it should be understood that other architectures including additional or even fewer elements may also be employed in connection with practicing embodiments of the present invention. The system includes an E-UTRAN 76 which may include, among other things, a plurality of node-Bs in communication with an EPC 78 which may include one or more mobility management entities (MMES) and one or more system architecture evolution (SAE) gateways. The node-Bs may be E-UTRAN node-Bs (e.g., eNBs 72) and may also be in communication with a first UE 70 and a second UE 71. Although FIG. 3 only shows a specific number of eNBs and UEs, there could be a plurality of nodes and mobile terminals included in the system. The E-UTRAN 76 may be in communication with the EPC 78 as part of an EPS (Evolved Packet System). Moreover, although FIG. 3 shows evolved node-Bs as the access points (APs), any AP or BS may be employed in connection with embodiments that operate in connection with other RATs.

The eNBs 72 may provide E-UTRA user plane and control plane (radio resource control (RRC)) protocol terminations for the first and second UEs 70 and 71. The eNBs 72 may provide functionality hosting for such functions as radio resource management, radio bearer control, radio admission control, connection mobility control, dynamic allocation of resources to UEs in both uplink and downlink, selection of an MME at UE attachment, IP header compression and encryption, scheduling of paging and broadcast information, routing of data, measurement and measurement reporting for configuration mobility, and the like.

The MME may host functions such as distribution of messages to respective node-Bs, security control, idle state mobility control, EPS bearer control, ciphering and integrity protection of NAS signaling, and the like. The SAE gateway may host functions such as termination and switching of certain packets for paging and support of UE mobility. In an exemplary embodiment, the EPC 78 may provide connection to a network such as the Internet.

As shown in FIG. 3, the first UE 70 may be in communication with the second UE 71 via device to device communication that may have been established by any known or available mechanism. Embodiments of the present invention may then be used to establish new or change previous communication allocations for enabling device to device communications via the same resources that permit device to access point (e.g., BS, AP, NB, eNB, etc.) communication. The first and second UEs 70 and 71 may each also be capable of communication with the eNB 72. However, in alternative embodiments, only one of the first and second UEs 70 and 71 may actually be associated with the AP (e.g., eNB 72). Moreover, as will be seen below, embodiments of the present invention may enable the provision of communications between multiple devices via device to device communication and between an AP and another device sharing the same resources. For example, the first and second UEs 70 and 71 may receive resource allocations from the eNB 72 with respect to device to device communications while the eNB 72 may concurrently utilize resources for communication with a third UE 79.

In an exemplary embodiment, one or more of the nodes or devices (e.g., the eNB 72, the first UE 70, and the second UE 71) may include an apparatus according to an exemplary embodiment of the present invention. The apparatus, an example of which is described below in the context of FIG. 4, may enable the respective node or device to operate in accordance with embodiments of the present invention. In this regard, for example, the apparatus may provide for an ability for one of the first and second UEs 70 and 71 (e.g., the first UE 70) to act as a lead UE with respect to coordination of device to device communication as described herein, while the other of the first and second UEs 70 and 71 (e.g., the second UE 71) may act as a follower UE. In other exemplary embodiments, a UE such as the first UE 70 acting as the lead terminal may request resources for device to device communication with multiple UEs. Furthermore, if one or more of the multiple UEs is associated with a different access point (e.g., different eNBs, nodes, base stations, etc.), multiple UEs, or even each UE, may request their own resources for device to device communication from their respective access points. As another alternative example, a device acting as the follower terminal (e.g., the second UE 71) may also request resources for device to device communication.

In an exemplary embodiment, the first UE may employ one embodiment of a device to device (D2D) communication coordinator 88 (see FIG. 4), for initiating D2D communication (e.g., direct communication between the first UE and the second UE without signaling from a network device such as an access point, base station or communication node) with the second UE, while the second UE may include another embodiment of the D2D communication coordinator 88 for receiving information indicative of resources allocated for D2D communication with the first UE. In this regard, since the first UE and second UE are merely role designations and not necessarily indicative of different capabilities, the D2D communication coordinator 88 employed on each of the first and second UEs may essentially be identical except that different functionalities of the D2D communication coordinator 88 may be utilized in each respective role. In another exemplary embodiment, the AP (e.g., eNB 72) may include yet another embodiment of the D2D communication coordinator 88 for responding to a request for resources for D2D communication from the first UE, which may include the allocation of resources. As shown in FIG. 3, according to an exemplary embodiment, the D2D communication coordinator 88 may be embodied as any of a resource allocator 80 (e.g., when embodied at the AP), a resource requestor 82 (e.g., when embodied at the first UE), or a resource receiver 84 (e.g., when embodied at the second UE).

Figure 4:
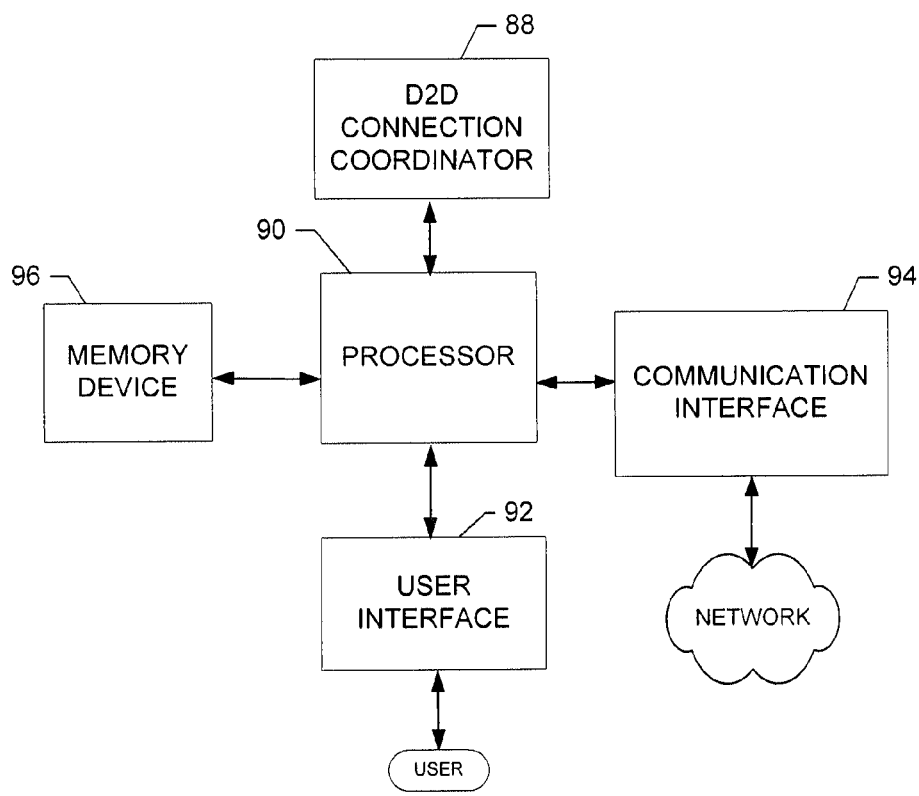
FIG. 4 illustrates a block diagram showing an apparatus for providing coordination of device to device communication according to an exemplary embodiment of the present invention.

FIG. 4 shows a block diagram view of one example of an apparatus configured to perform exemplary embodiments of the present invention. In this regard, for example, an apparatus for enabling coordination of D2D communication according to an exemplary embodiment of the present invention may be embodied as or otherwise employed, for example, on the mobile terminal 10 (e.g., the first or second UE 70, 71) or the eNB 72. However, it should be noted that the apparatus of FIG. 4, may also be employed on a variety of other devices, both mobile and fixed, and therefore, embodiments of the present invention should not necessarily be limited to application on devices such as mobile terminals or APs. It should also be noted that while FIG. 4 illustrates one example of a configuration of an apparatus for enabling coordination of D2D communication, numerous other configurations may also be used to implement embodiments of the present invention.

Referring now to FIG. 4, an apparatus for enabling coordination of D2D communication is provided. The apparatus may include or otherwise be in communication with a processor 90, a user interface 92, a communication interface 94 and a memory device 96. The memory device 96 may include, for example, volatile and/or non-volatile memory (e.g., volatile memory 40 and/or non-volatile memory 42 or a memory of or accessible to the eNB 72). The memory device 96 may be configured to store information, data, applications, instructions or the like for enabling the apparatus to carry out various functions in accordance with exemplary embodiments of the present invention. For example, the memory device 96 could be configured to buffer input data for processing by the processor 90. Additionally or alternatively, the memory device 96 could be configured to store instructions corresponding to an application for execution by the processor 90. As yet another alternative, the memory device 96 may be one of a plurality of databases that store information in the form of static and/or dynamic information.

The processor 90 may be embodied in a number of different ways. For example, the processor 90 may be embodied as a processing element, a coprocessor, a controller or various other processing means or devices including integrated circuits such as, for example, an ASIC (application specific integrated circuit) or FPGA (field programmable gate array). In an exemplary embodiment, the processor 90 may be configured to execute instructions stored in the memory device 96 or otherwise accessible to the processor 90. Meanwhile, the communication interface 94 may be embodied as any device or means embodied in either hardware, software, or a combination of hardware and software that is configured to receive and/or transmit data from/to a network and/or any other device or module in communication with the apparatus. In this regard, the communication interface 94 may include, for example, an antenna (or antennas) and supporting hardware and/or software for enabling communications with a wireless communication network.

The user interface 92 may be in communication with the processor 90 to receive an indication of a user input at the user interface 92 and/or to provide an audible, visual, mechanical or other output to the user. As such, the user interface 92 may include, for example, a keyboard, a mouse, a joystick, a trackball, a touch screen display, a conventional display, a microphone, a speaker, or other input/output mechanisms. In an embodiment in which the apparatus is embodied at a server or network node (e.g. the eNB 72), the user interface 92 may be limited or even eliminated.

As indicated above, in an exemplary embodiment, the apparatus may also include the D2D communication coordinator 88. The D2D communication coordinator 88 may be any means such as a device or circuitry embodied in hardware, software or a combination of hardware and software that is configured to communicate (e.g., via the processor 90) with the communication interface 94 in order to transmit and/or receive information related to coordinating D2D communication in accordance with embodiments of the present invention. In some cases the D2D communication coordinator 88 may be further configured to determine resource allocations based on current conditions, user requests, or other factors. In this regard, for example, the D2D communication coordinator 88 may be configured to request a resource allocation for D2D communication (e.g., when embodied as the resource requestor 82) and receive indications or information indicative of the resources allocated (e.g., when embodied as the resource requestor 82 or the resource receiver 84). The D2D communication coordinator 88 may alternatively or additionally be configured to determine and/or provide a resource allocation for D2D communication to other devices (e.g., when embodied as the resource requestor 82 or the resource allocator 80) or provide changes or updates to previously provided resource allocation information (e.g., when embodied as the resource allocator 80). As such, each of the resource allocator 80, the resource requestor 82, and the resource receiver 84 may be any means such as a device or circuitry embodied in hardware, software or a combination of hardware and software that is configured to perform the corresponding functions of the resource allocator 80, the resource requestor 82, and the resource receiver 84, respectively, as described herein.

According to alternative exemplary embodiments, a UE acting as the lead UE (e.g., the first UE 70) may request initiation of resource allocation for D2D communication from the AP (e.g., a BS, AP, NB, or eNB such as eNB 72), and the resources allocated by the AP may be communicated either to both the first UE and another UE acting as the follower UE (e.g., the second UE 71) by the AP or the AP may only provide information indicative of the resource allocation to the first UE and the first UE may provide the information to the second UE. In this regard, for example, if both the first and second UEs are associated with the AP, the AP may provide the information to both the first and second UEs. Alternatively, for example, if the second UE is not associated with the AP, the AP may provide the information to the first UE and the first UE may pass the information along to the second UE using an existing connection or a prior resource allocation.

In general, the first UE may operate (e.g., via the resource requestor 82) to initiate or schedule direct link communication with the second UE. According to embodiments of the present invention, the first UE requests resources for such connection from the AP. As such, the AP may grant resources to the first and second UE (directly or indirectly) in order to support the communication requested. Meanwhile, the AP may remain responsible for typical AP functionalities such as paging devices in D2D communication or communicating with other UEs (e.g., the third UE 79) while supporting D2D communication. In an exemplary embodiment, the first UE may signal scheduling decisions or other information indicative of the resource allocation received from the AP to the second UE at a particular or fixed position within the resources of the AP using, for example, a D2D common control channel (CCCH). The resources allocated to D2D communication may be those of at least one of the uplink or downlink phase of the cellular AP to UE communication. D2D communication may thus allocate dedicated uplink resources of cellular communication, dedicated downlink resources of cellular communication or both uplink and downlink resources of cellular communication. In a time divided uplink-downlink cellular duplex, even with a dynamic uplink-downlink switching point, D2D communication may allocate resources specifically from the uplink share or specifically from the downlink share, or from both of the uplink and downlink shares of cellular communication in a dynamic manner. In an exemplary embodiment, specific criteria may exist defining for D2D communication, which D2D connections utilize resources allocated from the uplink share, which D2D connections utilize resources from the downlink share, and which connections utilize resources from both the downlink and uplink shares to thereby give the AP control over options for providing resources for D2D communication. The allocation for D2D communication may actually reuse time-frequency resources for cellular communication. Additionally, it may be feasible to dedicate some (temporarily) non-used cellular resources for D2D communication. Moreover, in an exemplary embodiment, the AP (e.g., via the resource allocator 80) may be configured to make alterations to the resource allocations previously provided at any time. Such alternations may be made for a number of reasons such as, for example, in consideration of or to balance loading, in consideration of or to reduce interference, or other like considerations.

Figure 5:
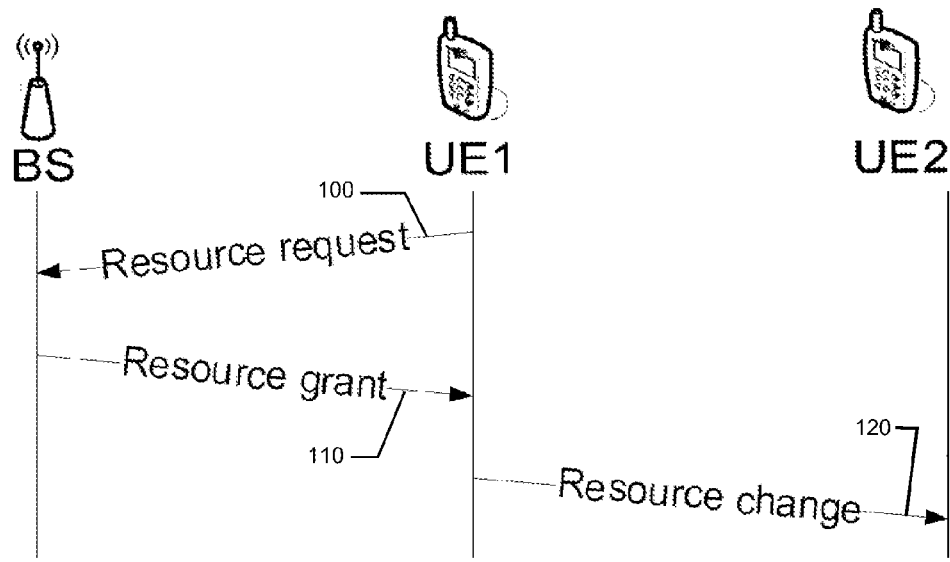
FIG. 5 illustrates a first UE and a second UE that are not associated with the same AP establishing device to device communication according to an exemplary embodiment of the present invention.

FIG. 5 illustrates one exemplary embodiment in which the first UE (e.g., UE1 acting as a lead UE) and the second UE (e.g., UE2 acting as a follower UE) are not associated with the same AP (e.g., BS). In this regard, as shown in FIG. 5, the first UE may request resources from the AP at operation 100. The first UE may then receive a resource grant message from the AP at operation 110 and communicate the information indicative of the resource allocation provided by the resource grant to the second UE at operation 120. In an exemplary embodiment, when the first UE requests resources for a direct link D2D communication with the second UE, the AP may allocate resources to be used for the direct link communication at operation 110 (e.g., via the resource allocator 80). The first UE may then inform the second UE of the resource change (e.g., either from zero resources to some amount of new resources or from some old amount of resources to some new amount of resources). If a common control channel position changes (e.g., if a particular portion of a predefined bandwidth allotment was initially allocated such as the first 20 MHz of a 100 MHz bandwidth and the portion is to be changed later to the second 20 MHz portion of the bandwidth allotment) a resource change may be provided by the AP and the first UE may communicate the change via an old resource allocation. If the common control channel position does not change, a new resource allocation may be used immediately. In an exemplary embodiment, the AP may provide the resource grant at operation 110 with, for example, an indication of an expiration for the corresponding allocation. Thus, for example, a resource allocation may be valid until either a new resource grant is issued to supersede a prior allocation or the resource allocation expires.

FIG. 6 illustrates an exemplary embodiment in which the first UE (e.g., UE1) and second UE (e.g., UE2) are both associated with the same AP (e.g., BS). In this example, the first UE may request resources from the AP at operation 150. The first UE may then receive a resource grant from the AP at operation 160. Meanwhile, the second UE may also receive the resource grant from the AP at operation 170.

In an exemplary embodiment, a resource request as provided by the first UE in operations 100 and 150 (e.g., via the resource requester 82) may contain an indication of the number of resource blocks (RBs) that the first UE is requesting for the D2D communication link. In some cases, the first UE may also specify a requested duration for the resource allocation requested. The duration may be based on a decision made by the user and a corresponding user input, based on user preferences, a user profile, or may be a predetermined value. An example of a resource request message is provided below in Table 1.

TABLE 1

Example resource request message.

| Message ID | Amount of resources requested (number of RB) | Duration of requested allocation (number of frames) |
|---|---|---|
|  | 12 | 15 |

In an exemplary embodiment, the AP may grant resources to the UEs for the D2D link, for example, by allocating adjacent RBs to the direct link as provided below in Table 2.

TABLE 2

Example resource grant message for adjacent RBs granted to direct link.

| Message ID | First granted RB (assuming numbered RBs in a frame) | Amount of granted resources (number of RB) | Start of allocation (in x frames) | Duration of allocation |
|---|---|---|---|---|
|  | 5 | 12 | 5 | 15 |

As an alternative, the AP may signal specific RBs that are granted to the UEs for the D2D link, for example, in a bitmap as shown in Table 3 below.

TABLE 3

Resource grant message using a bitmap to indicate allocation.

| Message ID | Bitmap | Start of allocation (in x frames) | Duration of allocation |
|---|---|---|---|
|  | 1 0 0 1 0 0 1 0 1 0 1 1 1 1 1 1 1 0 0 0 0 1 0 0 0 0 0 0 0 0 0 0 0 0 0 0 0 0 0 0 0 0 0 0 | 5 | 15 |

As shown in Tables 2 and 3, the AP can further indicate the duration of the allocation, the amount of resources granted and when the allocation begins. The amount of resources granted may be the same as the amount requested if the AP (e.g., via the resource allocator 80) determines that the allocation requested can be supported based on current network conditions. Alternatively, the amount of resources granted may be determined based on current loading, interference or other conditions, or based on a predetermined value.

In situations in which resource allocations are changed, a resource change message may be communicated (e.g., either directly to both of the UEs or to the first UE for relaying to the second UE) by the AP. As an example, if a resource change is conducted due to a change of position of the common control channel, the resource change message may include allocated RBs and the position of the common control channel. Tables 4 and 5 below provide examples of resource change messages in which sequentially located RBs are granted (e.g., Table 4) and in which a bitmap indicates for which RBs the common control channel has changed (e.g., Table 5).

TABLE 4

Example resource change message for adjacent RBs granted to direct link. RB number 10 will contain the location of the CCCH where UE1 sends control information (e.g. scheduling information) to UE2.

| Message ID | First granted RB (assuming numbered RBs in a frame) | Amount of granted resources (number of RB) | Location of CCCH |
|---|---|---|---|
|  | 5 | 12 | 10 |

TABLE 5

Example resource change message using a bitmap to indicate allocation. RB number 11 will contain the location of the CCCH where UE1 sends control information (e.g. scheduling information) to UE2.

| Message ID | Bitmap | Location of CCCH |
|---|---|---|
|  | 1 0 0 1 0 0 1 0 1 0 1 1 1 1 1 1 1 0 0 0 0 1 0 0 0 0 0 0 0 0 0 0 0 0 0 0 0 0 0 0 0 0 0 0 | 11 |

Embodiments of the present invention may be practiced in connection with a number of different employment options. For example, the common control channel could be at a fixed position such as the first RB in use. In some embodiments, system bandwidth may be divided into subbands (e.g., a 20 MHz subband within a 100 MHz bandwidth) and resource allocation may include an identification of a number corresponding to the subband allocated in addition to the allocated RBs. In an exemplary embodiment, the AP may wait until an acknowledgement is received from the first UE (and second UE when the second UE is also connected to the AP) before the resource allocation becomes valid. Similarly, after sending a resource change message to the second UE, the first UE may wait for acknowledgment from the second UE before the assignment is valid. In some cases, the AP and/or the first UE may not require an acknowledgement from the second UE after a resource grant, but may use hybrid automatic repeat-request (HARQ) or automatic repeat-request (ARQ) to ensure that the resource grant was received. In another exemplary embodiment, instead of granting resources to a direct link connection, the AP may grant separate resources to the first UE and second UE.

Embodiments of the present invention may provide an AP with full control over the resources used by D2D links. As such, resources can be flexibly assigned based on actual traffic conditions with finer granularity than traditional mechanisms, while maintaining a lower signaling overhead than some such traditional mechanisms. Embodiments of the present invention may also enable the D2D communication links to use the same resources the AP uses simultaneously (e.g., while the AP uses the resources for communication with other devices). Moreover, the D2D links provided by embodiments of the present invention may not reduce the resources used by the AP if the D2D links are not present or in use. In other words, unlike Tetra, which reserves channels for direct links even if the links are not in use, embodiments of the present invention may only provide the links for a limited duration corresponding to the time that such links are actually used.

The above described embodiments could also be modified to support charging for services provided. For example, the network may grant a token for a particular data amount or amount or resource consumption. The token could be periodically renewed by the network and the user may be charged for issuance and renewal of the token. In other alternative embodiments, the network (e.g., via the AP) may not grant specific resources to UEs for D2D communication. Instead, the network may set aside a portion or plurality of resources into, for example, a resource pool with indications of (discrete) operation constraints for each resource in the resource pool. Resources within the pool may then be dynamically shared between multiple D2D connections and allocated by a D2D scheduling entity via, for example, direct signaling or sensing reserved busy bursts. In an exemplary embodiment, busy bursts may be indicative of the reservation of time-frequency resources for D2D communication from the pool of resources. Sensing busy bursts may allow a device to detect in-use or interfered with resources. The device for D2D communication may dynamically select feasible resources for D2D communication and may signal its reservation in busy bursts for the information of other devices in that area (e.g., inside the busy burst signaling range).

FIGS. 7 and 8 are flowcharts of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or node and executed by a processor in the mobile terminal or node. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing coordination of device to device communication from the perspective of a network node as provided in FIG. 7 may include receiving a request for a resource allocation from a first terminal (e.g., a lead UE or lead terminal) at operation 200. The resource allocation may be related to resources usable for device to device communication between the first terminal and a second terminal (e.g., a follower terminal). The method may further include determining a resource allocation including an amount and duration of resources to be provided in response to the request at operation 210, and communicating the resource allocation to the first terminal at operation 220.

In an alternative exemplary embodiment, further optional operations may be included, an example of which is shown in dashed lines in FIG. 7. In this regard, the method may further include communicating the resource allocation to the second terminal at operation 230. In an exemplary embodiment, communicating the resource allocation may include indicating a plurality of sequential resource blocks allocated and indicating a starting point of the blocks allocated and a number of frames during which the blocks are to be allocated. Alternatively, communicating the resource allocation may include indicating a plurality of non sequential resource blocks allocated using a bitmap. In some embodiments, determining the resource allocation may include determining a portion of time and frequency domain resources used by a network communication node receiving the request to be allocated to the first terminal.

In an exemplary embodiment, operation 210 may include determining a pool of available resources with operational constraints for each resource in the pool and operation 220 may include communicating an identification of the pool to the first terminal. In such an embodiment, the method may further include enabling utilization of free resources from the pool for device to device communication including a third terminal.

In an exemplary embodiment, an apparatus for performing the method above may include a processor (e.g., the processor 90) configured to perform each of the operations (200-230) described above. The processor may, for example, be configured to perform the operations by executing stored instructions or an algorithm for performing each of the operations. Alternatively, the apparatus may include means for performing each of the operations described above. In this regard, according to an exemplary embodiment, examples of means for performing operations 200 to 230 may include, for example, an algorithm for managing resource allocation determination and communications regarding resource allocations, the D2D communication coordinator 88, the resource allocator 80, or the processor 90.

Another embodiment of a method for providing coordination of device to device communication from the perspective of a network node as provided in FIG. 8 may include communicating a request for a resource allocation to a network communication node at operation 300. The resource allocation may be related to resources usable for device to device communication between a first terminal (e.g., a lead terminal) communicating the request and a second terminal (e.g., a follower terminal). The method may further include receiving a resource allocation including an amount and duration of resources to be used for the device to device communication in response to the request at operation 310 and utilizing the resource allocation for device to device communication with the second terminal at operation 320.

In an alternative exemplary embodiment, further optional operations may be included, an example of which is shown in dashed lines in FIG. 8. In this regard, the method may further include communicating the resource allocation to the second terminal at operation 315. In an exemplary embodiment, receiving the resource allocation may include receiving an indication of a plurality of sequential resource blocks allocated and receiving an indication of a starting point of the blocks allocated and a number of frames during which the blocks are to be allocated. Alternatively, receiving the resource allocation may include receiving an indication of a plurality of non sequential resource blocks allocated using a bitmap. In some embodiments, receiving the resource allocation may include receiving a portion of time and frequency domain resources used by the network communication node to be allocated to the first terminal.

In an exemplary embodiment, operation 310 may include receiving an indication of a pool of available resources with operational constraints for each resource in the pool. In such an embodiment, operation 320 may include selecting a portion of the resources in the pool for D2D communication with the second terminal or utilizing the resources of the pool for D2D communication with a third terminal.

In an exemplary embodiment, an apparatus for performing the method above may include a processor (e.g., the processor 90) configured to perform each of the operations (300-320) described above. The processor may, for example, be configured to perform the operations by executing stored instructions or an algorithm for performing each of the operations. Alternatively, the apparatus may include means for performing each of the operations described above. In this regard, according to an exemplary embodiment, examples of means for performing operations 300 to 320 may include, for example, an algorithm for managing resource allocation requests and communications regarding resource allocations, the D2D communication coordinator 88, the resource requester 82, or the processor 90.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, by a network communication node, a request for a resource allocation from a first user equipment, the resource allocation being related to resources usable for direct device to device communication between the first user equipment and a second user equipment, wherein the direct device to device communication does not involve signaling between the first user equipment and the second user equipment via a further network device;
   determining, by the network communication node, a resource allocation including an amount and duration of resources to be provided in response to the request;
   communicating, by the network communication node, the resource allocation to the first user equipment;
   communicating, by the network communication node, the resource allocation to the second user equipment when the first user equipment and the second user equipment are associated with the network communication node; and
   communicating, by the network communication node, a resource change message to one or more of the first user equipment and the second user equipment, the resource change message indicating a change in the resource allocation to at least a position of a common control channel that supports the direct device to device communication and superseding the resource allocation.

2. The method of claim 1, wherein the communicating the resource allocation comprises indicating a plurality of sequential resource blocks allocated and indicating a starting point of the blocks allocated and a number of frames during which the blocks are to be allocated.

3. The method of claim 1, wherein the communicating the resource allocation comprises indicating a plurality of non-sequential resource blocks allocated using a bitmap.

4. The method of claim 1, wherein the determining the resource allocation comprises determining a portion of time and frequency domain resources to be allocated to the first user equipment.

5. The method of claim 1, wherein the determining the resource allocation comprises determining a pool of available resources with operational constraints for each resource in the pool and wherein the communicating the resource allocation comprises communicating an identification of the pool to the first user equipment.

6. The method of claim 5, further comprising enabling utilization of free resources from the pool for direct device to device communication including a third user equipment.

7. The method of claim 1, wherein the resource allocation includes an expiration time for the resource allocation.

8. The method of claim 7, wherein the resource allocation is valid until at least one of: a new resource grant is issued or the resource allocation expires.

9. An apparatus comprising:
   at least one processor; and
   at least one memory including computer program code, the at least one processor, the at least one memory, and the computer program code configured to cause the apparatus to perform at least the following:
   receive a request for a resource allocation from a first user equipment, the resource allocation being related to resources usable for direct device to device communication between the first user equipment and a second user equipment, wherein the direct device to device communication does not involve signaling between the first user equipment and the second user equipment via a further network device;
   determine a resource allocation including an amount and duration of resources to be provided in response to the request;
   communicate the resource allocation to the first user equipment;
   communicate the resource allocation to the second user equipment when the first user equipment and the second user equipment are associated with the apparatus; and
   communicate a resource change message to one or more of the first user equipment and the second user equipment, the resource change message indicating a change in the resource allocation to at least a position of a common control channel that supports the direct device to device communication and superseding the resource allocation, wherein the apparatus is a network communication node.

10. The apparatus of claim 9, wherein the apparatus is configured to communicate the resource allocation including an indication of a plurality of sequential resource blocks allocated and an indication of a starting point of the blocks allocated and a number of frames during which the blocks are to be allocated.

11. The apparatus of claim 9, wherein the apparatus is configured to communicate the resource allocation including an indication of a plurality of non-sequential resource blocks allocated using a bitmap.

12. The apparatus of claim 9, wherein the apparatus is configured to determine the resource allocation by determining a portion of time and frequency domain resources to be allocated to the first user equipment.

13. An apparatus comprising:
at least one processor; and
at least one memory including computer program code, the at least one processor, the at least one memory, and the computer program code configured to cause the apparatus to perform at least the following:
communicate a request for a resource allocation to a network communication node, the resource allocation being related to resources usable for direct device to device communication between a first user equipment communicating the request and a second user equipment, wherein the direct device to device communication does not involve signaling between the first user equipment and the second user equipment via a further network device;
receive a resource allocation including an amount and duration of resources to be used for the direct device to device communication in response to the request;
utilize the resource allocation for the direct device to device communication with the second user equipment;
communicate the resource allocation to the second user equipment when the second user equipment is not associated with the network communication node; and
receive a resource change message indicating a change in the resource allocation to at least a position of a common control channel that supports the direct device to device communication and superseding the resource allocation.

14. The apparatus of claim 13, wherein the apparatus is configured to receive the resource allocation including an indication of a plurality of sequential resource blocks allocated and an indication of a starting point of the blocks allocated and a number of frames during which the blocks are to be allocated.

15. The apparatus of claim 13, wherein the apparatus is configured to receive the resource allocation including an indication of a plurality of non-sequential resource blocks allocated using a bitmap.

16. The apparatus of claim 13, wherein the apparatus is configured to receive the resource allocation including a portion of time and frequency domain resources to be allocated to the first user equipment.

17. The apparatus of claim 13, wherein the apparatus is configured to receive the resource allocation including an indication of a pool of available resources with operational constraints for each resource in the pool.

18. The apparatus of claim 17, wherein the apparatus is configured to utilize the resource allocation by utilizing free resources from the pool for direct device to device communication with a third user equipment.

19. The apparatus of claim 17, wherein the apparatus is configured to utilize the resource allocation by selecting a portion of the resources in the pool and utilizing the selected portion for direct device to device communication with the second user equipment.

20. The apparatus of claim 13, wherein the apparatus is further configured to wait for an acknowledgement from the second user equipment.

21. The apparatus of claim 20, wherein the apparatus is configured to consider the resource allocation valid responsive to receiving the acknowledgement.

22. The apparatus of claim 13, wherein the apparatus is configured to consider the resource allocation valid based on at least one of a hybrid automatic repeat-request mechanism and an automatic repeat-request mechanism.

23. A method comprising:
communicating a request for a resource allocation to a network communication node, the resource allocation being related to resources usable for direct device to device communication between a first user equipment communicating the request and a second user equipment, wherein the direct device to device communication does not involve signaling between the first user equipment and the second user equipment via a further network device;
receiving a resource allocation including an amount and duration of resources to be used for the direct device to device communication in response to the request;
utilizing the resource allocation for the direct device to device communication with the second user equipment;
communicating the resource allocation to the second user equipment when the second user equipment is not associated with the network communication node; and
receiving a resource change message indicating a change in the resource allocation to at least a position of a common control channel that supports the direct device to device communication and superseding the resource allocation.

24. The method of claim 23, further comprising waiting for an acknowledgement from the second user equipment.

25. The method of claim 24, further comprising considering the resource allocation valid responsive to receiving the acknowledgement.

26. The method of claim 23, further comprising considering the resource allocation valid based on at least one of a hybrid automatic repeat-request mechanism and an automatic repeat-request mechanism.

27. A computer program product comprising a non-transitory computer-readable medium encoded with instructions that, when executed by at least one processor, perform at least the following:
communicating a request for a resource allocation to a network communication node, the resource allocation being related to resources usable for direct device to device communication between a first user equipment communicating the request and a second user equipment, wherein the direct device to device communication does not involve signaling between the first user equipment and the second user equipment via a further network device;
receiving a resource allocation including an amount and duration of resources to be used for the direct device to device communication in response to the request;
utilizing the resource allocation for the direct device to device communication with the second user equipment;

communicating the resource allocation to the second user equipment when the second user equipment is not associated with the network communication node; and receiving a resource change message indicating a change in the resource allocation to at least a position of a common control channel that supports the direct device to device communication and superseding the resource allocation.

28. A computer program product comprising a non-transitory computer-readable medium encoded with instructions that, when executed by at least one processor, perform at least the following:

receiving, by a network communication node, a request for a resource allocation from a first user equipment, the resource allocation being related to resources usable for direct device to device communication between the first user equipment and a second user equipment, wherein the direct device to device communication does not involve signaling between the first user equipment and the second user equipment via a further network device;

determining, by the network communication node, a resource allocation including an amount and duration of resources to be provided in response to the request; and communicating, by the network communication node, the resource allocation to the first user equipment;

communicating, by the network communication node, the resource allocation to the second user equipment when the first user equipment and the second user equipment are associated with the network communication node; and communicating, by the network communication node, a resource change message to one or more of the first user equipment and the second user equipment, the resource change message indicating a change in the resource allocation to at least a position of a common control channel that supports the direct device to device communication and superseding the resource allocation.

* * * * *